(12) United States Patent
Ivicevic

(10) Patent No.: US 11,759,901 B2
(45) Date of Patent: Sep. 19, 2023

(54) CLAMP FOR RETAINING A WORKPIECE

(71) Applicant: Pero Ivicevic, St. Louis, MO (US)

(72) Inventor: Pero Ivicevic, St. Louis, MO (US)

(*) Notice: Subject to any disclaimer, the term of this patent is extended or adjusted under 35 U.S.C. 154(b) by 0 days.

(21) Appl. No.: 17/369,135

(22) Filed: Jul. 7, 2021

(65) Prior Publication Data
US 2023/0009066 A1    Jan. 12, 2023

(51) Int. Cl.
*B23Q 3/06*    (2006.01)

(52) U.S. Cl.
CPC ............. *B23Q 3/061* (2013.01); *B23Q 3/069* (2013.01); *B23Q 2703/08* (2013.01)

(58) Field of Classification Search
CPC . B23Q 3/00; B23Q 3/06; B23Q 3/067; B23Q 3/152; B23Q 3/061; B23Q 3/069; B23Q 2703/08; B23Q 3/103; B23Q 2703/02; B23Q 3/102; B25B 5/105; B25B 5/10; B25B 1/10; B25B 5/106; F16B 2/065; Y10T 403/335; Y10T 292/20; E01B 9/28
USPC .. 269/55, 71, 73, 43, 45, 309, 310, 137, 93, 269/94, 134, 152, 210, 240, 342, 351, 269/377, 256, 265; 451/365
See application file for complete search history.

(56) References Cited

U.S. PATENT DOCUMENTS

| | | | | |
|---|---|---|---|---|
| 1,376,077 A * | 4/1921 | Cadwallader, Jr. | ..... | B25B 5/104 269/93 |
| 1,676,289 A * | 7/1928 | Schmalz | ................ | B25B 5/105 269/93 |
| 2,452,824 A * | 11/1948 | Yates | ................ | B23Q 3/06 269/135 |
| 2,637,249 A * | 5/1953 | Swenson | .................. | B25B 5/10 269/134 |
| 3,406,958 A * | 10/1968 | Geneloni | ................ | B25B 5/08 269/137 |
| 3,712,606 A * | 1/1973 | Cole | ................ | B25B 5/106 269/92 |
| 4,049,253 A * | 9/1977 | Mandel | ................ | B23Q 3/102 269/137 |
| 4,243,213 A * | 1/1981 | Georgian | ................ | B25B 1/12 269/902 |
| 4,489,927 A * | 12/1984 | Yamada | ................ | B23Q 3/102 269/137 |
| 4,735,404 A * | 4/1988 | Blumle | ................ | B25B 5/10 267/137 |
| 4,772,000 A * | 9/1988 | Aubert | ................ | B25B 1/2473 269/137 |
| 5,025,987 A * | 6/1991 | Kotecki | ................ | E01B 9/28 238/342 |
| 5,149,070 A * | 9/1992 | Dykstra | ................ | B25B 5/061 269/137 |
| 6,202,996 B1 * | 3/2001 | Cutsforth | ................ | B25B 5/10 269/25 |
| 2002/0088868 A1 * | 7/2002 | Kirchner | ................ | F16B 2/065 238/310 |
| 2015/0053783 A1 * | 2/2015 | Austin | ................ | E01B 26/00 29/525.02 |

* cited by examiner

*Primary Examiner* — Tyrone V Hall, Jr.
(74) *Attorney, Agent, or Firm* — Douglas E. Warren

(57) ABSTRACT

A clamp for retaining a workpiece onto a fixture whereby the method of connecting the clamp to the fixture provides for a simultaneous combination of both horizontal and vertical clamping forces against the workpiece without locating any portion of the clamp above the upper surface of the workpiece.

9 Claims, 3 Drawing Sheets

CLAMP FOR RETAINING A WORKPIECE

CROSS REFERENCE TO RELATED APPLICATIONS

Not applicable.

STATEMENT REGARDING FEDERALLY SPONSORED RESEARCH

Not Applicable.

BACKGROUND OF THE INVENTION

During the manufacturing of many types of machined parts, the manufacturing process requires a workpiece as an initial portion of raw material having a shape that allows the part to be produced by removal of unwanted raw material from the initial portion of raw material. That workpiece must be clamped within a machine such that the workpiece is rigidly retained in the machine as various types of milling and machining tools remove portions of unwanted material from the workpiece. In the design of certain manufactured items there is a need to machine an entire upper surface of the workpiece to obtain the necessary upper surface design.

Presently there is a wide range of workpiece clamps that are capable of retaining a workpiece within a machining device. Many of those present examples retain the workpiece position by clamping the upper surface of the workpiece. Although that type of upper clamping may secure the workpiece within the machining device, that type of clamping prevents the machining device from machining substantially all or all of the upper surface of the workpiece.

Yet other presently designed workpiece clamps can only provide clamping in just the horizontal direction or in just the vertical direction. That type of unidirectional clamping force does not assist in retaining the workpiece when the machining action of the tool within a machining device applies force in a direction that is not aligned with the direction of the clamping force applied by those previous clamping designs.

When such upper surfaces of the workpiece must be substantially or totally machined, it is critical that the workpiece be securely fastened into the machining device without placing any hold down clamps within the path of the milling or machining tools that are used by the machining device during the milling of the upper surface of the workpiece. Neither of those examples provide bidirectional clamping along two axes while at the same time not positioning the hold down clamp on the workpiece in a position that would cause the clamp to interfere with the machining of the entire upper surface of the workpiece when the design requires that type of machining. Thus, in these specialized situations there is a need for a clamp assembly that can sufficiently retain the workpiece from the side by applying clamping force in a bidirectional manner.

In view of the above, it is desirable to design a clamp that can efficiently and simultaneously provide clamping forces in both vertical and horizontal clamping directions to more securely retain a workpiece during the machining of the workpiece, and that the clamp achieve that result by clamping only the side of the workpiece. The present invention addresses that need by including a novel method of applying both of those clamping forces with a single clamp retention design.

SUMMARY OF THE INVENTION

This section provides a general summary of the disclosure, and is not a comprehensive disclosure of its full scope or all of its features. In accordance with the various embodiments of the present invention, this invention relates to a clamp used to retain a workpiece on a machining device wherein the clamp simultaneously provides both horizontal clamping forces and vertical clamping forces against the workpiece to clamp the workpiece within the machining device in a manner that does not require any portion of the clamp to protrude above the upper surface of the workpiece.

Further areas of applicability will become apparent from the description provided herein. The descriptions in this summary are intended for purposes of illustration only and are not intended to limit the scope or the claims of the present disclosure.

DESCRIPTION OF THE DRAWINGS

In the accompanying drawings which form a part of the specification.

Corresponding reference numerals indicate corresponding steps or parts throughout the several figures of the drawings.

Figure 1:
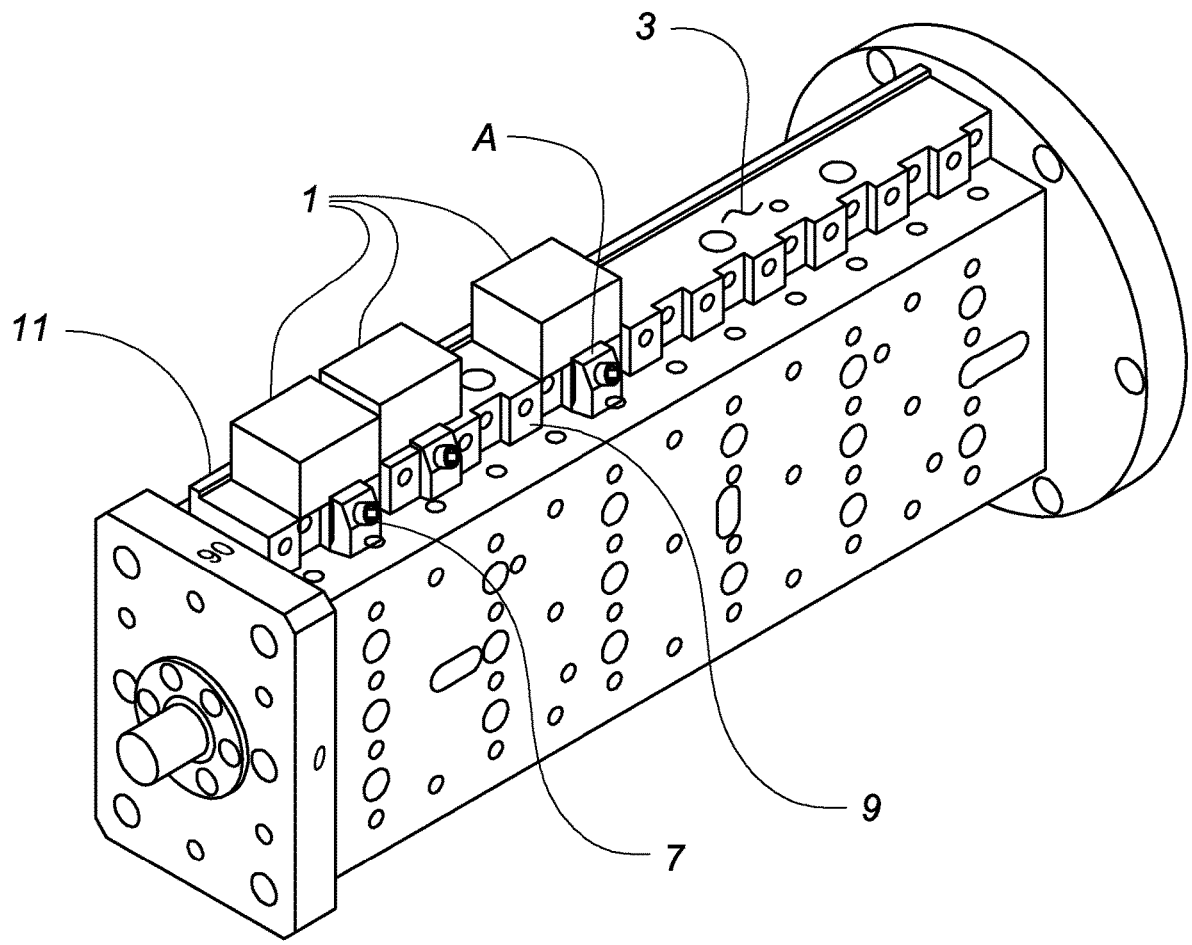
FIG. 1 is a perspective view of one embodiment of the present invention showing the clamp A mounted onto one embodiment of a fixture that is used in conjunction with the present clamp to hold a workpiece onto the present fixture.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

At least one preferred embodiment of the present invention is illustrated in the drawings and figures contained within this specification. More specifically, some preferred embodiments of the present invention are generally disclosed and described in FIGS. 1-5. In each of the following embodiments, and in yet other alternative embodiments, a workpiece to be machined is retained within a fixture by captivating the workpiece between a first clamping element of the fixture and various embodiments of the present invention of a clamp A.

Referring now to FIG. 1, an exemplary workpiece 1 is retained in position onto one embodiment of a fixture 3 by a clamp A mounted onto the fixture by attachment of a fastener 7 onto the fixture by installation of the fastener into a matching attachment opening 9 to thereby clamp the workpiece between a retention rib 11 and a clamping portion 17 of the clamp when the fastener is installed. In the present embodiment, the fixture 3 is deigned to hold and allow for the retention of a plurality of substantially rectangular workpieces 1 onto the fixture 3. It is appreciated by those of skill in the art that the quantity and arrangement of the workpieces 1 mounted onto the fixture 3 as shown in FIG. 1 is just one example of the mounting of multiple workpieces onto the fixture, and that the quantity and mounting arrangement of the workpieces can be adjusted and adapted to meet the specific requirement of any machining process to allow for the appropriate mounting and arrangement of the workpieces onto the fixture. Additionally, it is understood that when the workpiece's 1 initial shape or final shape of the machined workpiece is different than a rectangular shape, the shape and design of the fixture 3 can be adjusted to adapt to the initial and final shapes of the workpiece as necessary while still remaining within the scope of the present claims. Finally, it is also understood that the design and configuration of the fixture 3 as shown in FIG. 1 is just one example of the overall design and configuration of the fixture and that the overall design and shape of the fixture can be adjusted as needed to allow the fixture to be used in conjunction with the operations and requirements of the machining device selected to machine the workpieces 1.

Figure 2:
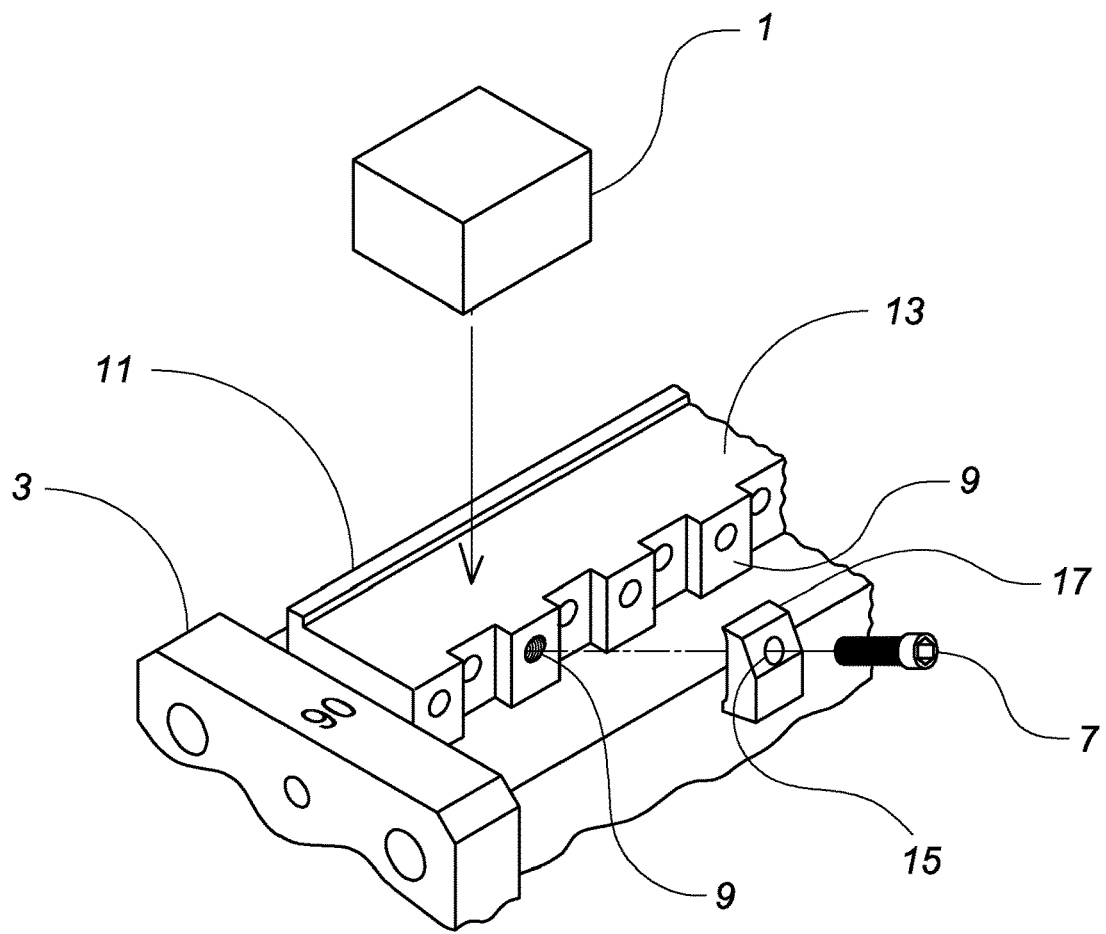
FIG. 2 is perspective exploded view of one embodiment of the present invention showing the method of attachment of an embodiment of the clamp A to one embodiment of the fixture to retain a workpiece into position.

FIG. 2 shows the workpiece 1 exploded from an upper mounting surface 13 the fixture 3. When the workpiece 1 is positioned on the fixture 3, the fastener 7 is installed onto the fixture by installing the fastener through an elongate opening 15 of a clamping portion 17. The workpiece 1 is placed upon the upper mounting surface 13 of the fixture 3 and, as the fastener 7 is tightened, the clamping portion 17 moves the workpiece toward the retention rib 11 until the workpiece is retained in position by the pressure of the clamp biasing the workpiece against the retention rib as the fastener is tightened. In the present embodiment, the attachment opening 9 is a threaded retention opening wherein the thread size and configuration of the threaded retention opening matches the thread size and configuration of the fastener 7. The threaded fastener 7 selected must have the strength to apply sufficient axial pressure against the clamping portion 17 to increase the clamping force applied to the workpiece 1 as the threaded fastener is rotated to engage the threaded portion of the fastener into the threaded retention opening of the fixture.

Figure 3:
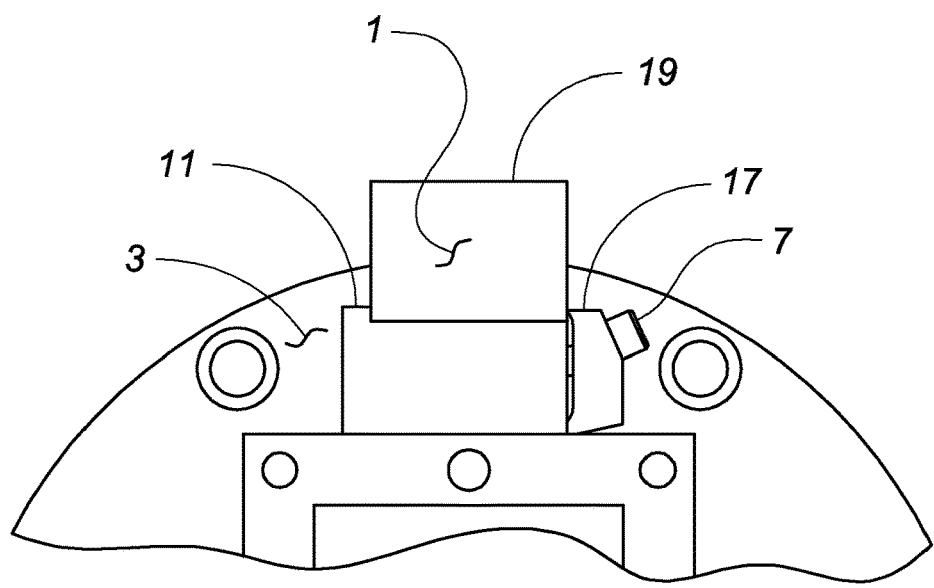
FIG. 3 is an end view of one embodiment of the present invention showing the clamp A mounted onto one embodiment of a fixture that is used in conjunction with the present clamp A to hold a workpiece onto the present fixture.

FIG. 3 shows the state of the clamping of the workpiece 1 as the workpiece is clamped into position on the fixture 3 by retention of the workpiece between the retention rib 11 and the clamping portion 17 of the clamp A. It is appreciated that neither the retention rib 11 or the clamping portion 17 is higher than the top surface 19 of the workpiece 1.

Figure 4:
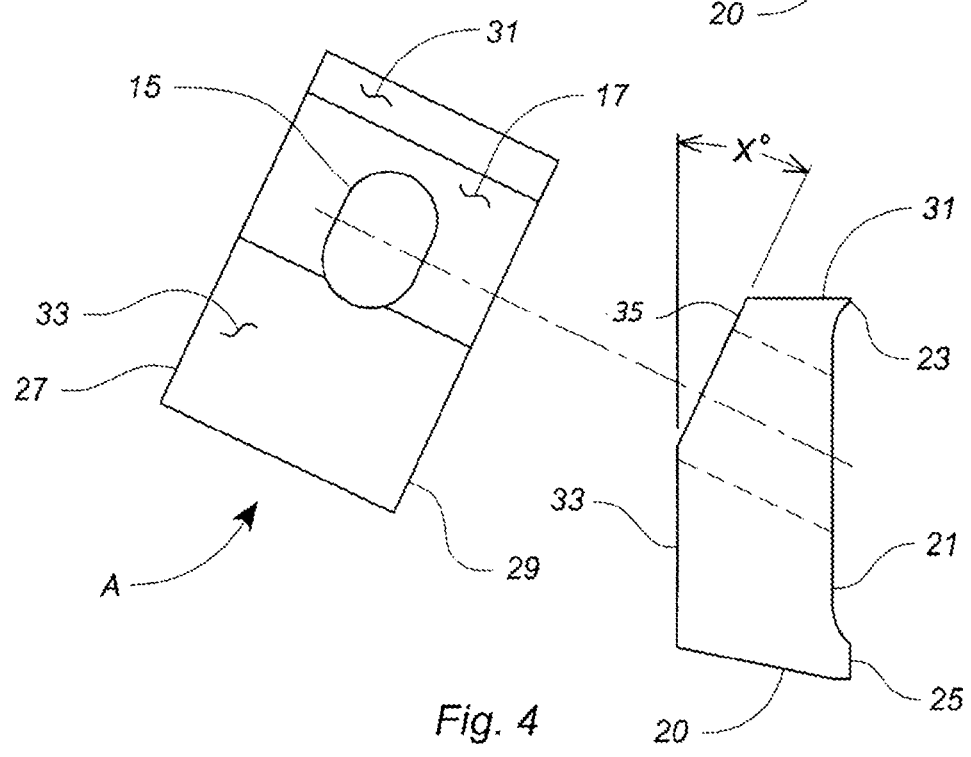
FIG. 4 is combined side view and orthographic projection showing the design of one embodiment of the current invention; and, FIG. 5 is combined side view and orthographic projection showing the design of another embodiment of the current invention.

One embodiment of the clamping portion 17 is shown in FIG. 4. In this embodiment, the clamping portion 17 has a clamping face 21 that includes an upper gripping element 23 and a lower gripping element 25. The upper gripping element 23 and the lower gripping element 25 are generally perpendicular with the clamping face 21 and extend outwardly from the clamping face such that each gripping element terminates about 0.5 inches from a back surface 33. Each of the upper gripping element 23 and the lower gripping element 25 are generally transversely continuous across the clamping face 21 and extend from a left surface 27 and to a right surface 29 of the clamping portion 17. It is noted that the upper gripping element 23 in the present embodiment terminates in a substantially pointed configuration.

In an alternative embodiment of the clamp shown in FIG. 4, the clamping face 21 has only the lower gripping element 25. This is to say, there is no upper gripping element 25 near the top portion 31 of the clamp portion 17. Instead, the clamping face 21 is generally flat and the only gripping element is the lower gripping element 25 near the bottom surface 20 of the clamping portion 17. It is understood that the lower gripping element 25 is disposed near the intersection of the bottom surface and the clamping face 21 of the clamping portion 17.

The clamping portion 17 also includes the back surface 33 that is generally parallel to the clamping face 21. The back surface 33 includes an upper angled surface 35 that extends from the face of the back surface to the surface of the top portion 31. The upper angled surface 35 has an angle "X" of between about 20 degrees and about 30 degrees with the back surface 33 of the clamping portion 17.

It is noted that the angled surface 35 includes the elongate opening 15. It is also noted that the elongate opening 15 is positioned in the clamping portion 17 such as to be in axial alignment with the attachment opening 9 of the fixture 3, and wherein the elongate opening has a longitudinal axis that is perpendicular to the angled surface. That is to say, the elongate opening 15 matches the size and axial placement of the attachment opening 9 to allow the clamping portion 17 to be positioned onto the fixture 3 when the fastener 7 is installed through the elongate opening of the clamping portion and threaded into the attachment opening of the fixture.

Figure 5:
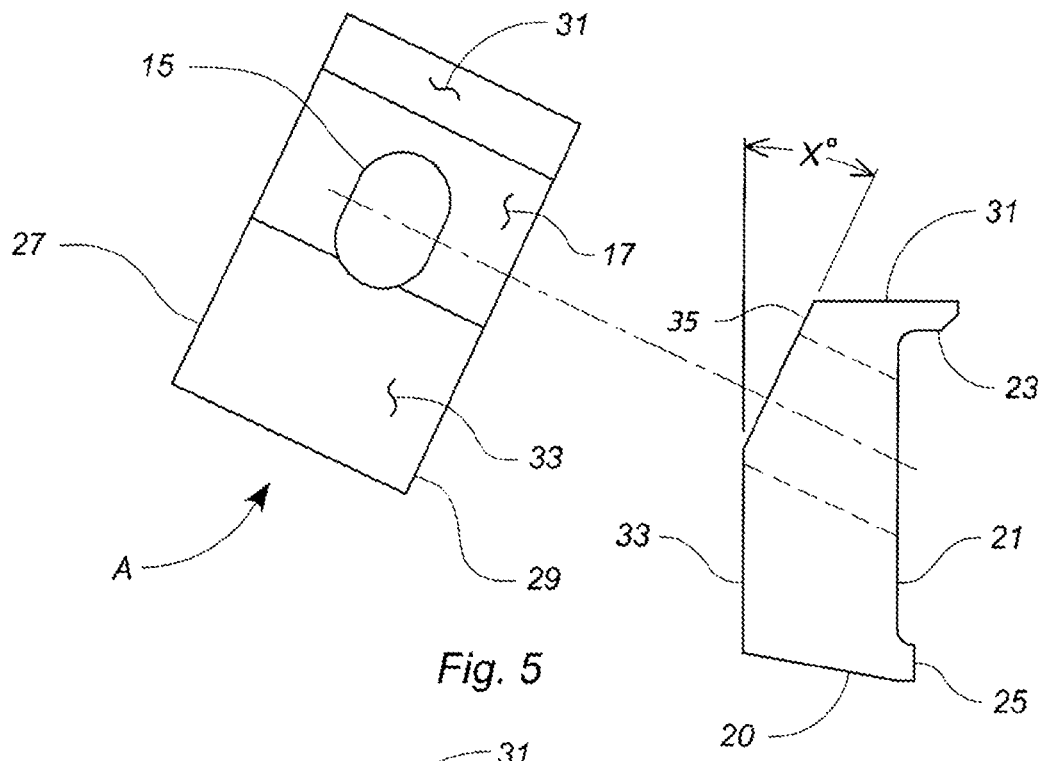

In yet another embodiment, FIG. 5 shows the clamping portion 17 having a second embodiment of the upper gripping element 23. The upper gripping element 23 and the lower gripping element 25 are generally perpendicular with the clamping face 21 and extend outwardly from the clamping face such that each gripping element terminates about 0.62 inches from a back surface 33. It is noted that the upper gripping element 23 in the present embodiment has a general cross section of an ogee having one of either a curved upper section or an angled upper section, and wherein the ogee protrudes from the clamping face 21. The lower gripping element 25 is the same as the lower gripping element of the previously above-described embodiment. As in the previous embodiment, each of the upper gripping element 23 and the lower gripping element 25 are generally continuous across the clamping face 21 and extend from the left surface 27 and to the right surface 29 of the clamping portion 17.

Each of the above embodiments are made from a steel material that is sufficiently strong enough to resist deformation of the clamping portion 17 when the fastener 7 has been tightened sufficiently enough to retain the workpiece 1 in its position on the fixture 3 during the machining process of the workpiece. It will be appreciated that in alternative embodiments, other materials may be used as long as the material selected results in the clamp A properly retaining the workpiece 1 to complete any required machining of the workpiece.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed. It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A clamp comprising:
   a clamping portion having a clamping face, a back surface, a top portion, a bottom surface, an angled surface that is at an angle of between 20 degrees and 30 degrees with the back surface, an elongate opening having a longitudinal axis that is perpendicular to the angled surface;
   an upper gripping element disposed near the intersection of the top portion and the clamping face:
   a lower gripping element that is perpendicular with the clamping face and extends outwardly from the clamping face and is transversely continuous across the clamping face to extend from a left surface and to a right surface of the clamping portion, that is disposed near the intersection of the bottom surface and the clamping face of the clamping portion, and wherein at least a portion of the lower gripping element has a flat face portion parallel with the clamping face; and,
   wherein the lower gripping element and the upper gripping element are movable to directly contact a holdable surface to provide any gripping action of the holdable surface between the clamping portion and a retention rib aligned with the clamping portion.

2. The clamp of claim 1 wherein the upper gripping element is perpendicular with the clamping face, wherein the upper gripping element extends outwardly from the clamping face and is generally transversely continuous across the clamping face to extend from a left surface and to a right surface of the clamping portion.

3. The clamp of claim 2 and wherein the upper gripping element includes a cross section that includes a pointed portion.

4. The clamp of claim 3 wherein the upper gripping element has a general cross section of an ogee having one of either a curved upper section or an angled upper section, and wherein the ogee protrudes from the clamping face and wherein the upper gripping element protrudes perpendicularly from the clamping face.

5. A clamp comprising:
   a clamping portion having a clamping face, a back surface, a top portion, a bottom surface, an angled surface at an angle of between 20 degrees and 30 degrees with the back surface, wherein the angled surface includes an elongate opening having a longitudinal axis that is perpendicular to the angled surface; and,
   a lower gripping element disposed near the intersection of the bottom surface and the clamping face wherein the lower gripping element is parallel with the clamping face, extends outwardly from the clamping face, is transversely continuous across the clamping face to extend from a left surface and to a right surface of the clamping portion, and is disposed near the intersection of the bottom surface and the clamping face.

6. The clamp of claim 5 wherein at least a portion of the lower gripping element has a flat face portion parallel with the clamping face.

7. The clamp of claim 6 further comprising an upper gripping element that is perpendicular with the clamping face, wherein the upper gripping element extends outwardly from the clamping face and is transversely continuous across the clamping face to extend from a left surface and to a right surface of the clamping portion.

8. The clamp of claim 7 and wherein the upper gripping element includes a cross section that includes a substantially pointed portion.

9. The clamp of claim 7 wherein the upper gripping element has a general cross section of an ogee having one of either a curved upper section or an angled upper section, and wherein the ogee protrudes from the clamping face and wherein the upper gripping element protrudes perpendicularly from the clamping face.

\* \* \* \* \*